UNITED STATES PATENT OFFICE.

EDGAR THEOPHILUS OLSON, OF ANN ARBOR, MICHIGAN, ASSIGNOR TO DETROIT ORGANIC CHEMICAL CO., OF DETROIT, MICHIGAN, A CORPORATION OF MICHIGAN.

PROCESS FOR THE PRODUCTION OF LACTIC ACID.

1,240,766. Specification of Letters Patent. Patented Sept. 18, 1917.

No Drawing. Application filed October 19, 1916. Serial No. 126,599.

*To all whom it may concern:*

Be it known that I, Edgar T. Olson, a citizen of the United States, residing at Ann Arbor, in the county of Washtenaw, State of Michigan, have invented certain naw and useful Improvements in Processes for Production of Lactic Acid, of which the following is a description.

My invention relates to the production of lactic acid conforming to the requirements of the *U. S. P.* from the commercial crude lactic acid or lactate solutions produced by the usual methods of lactic acid fermentation and comprises a process wherein the said commercial solutions are treated for the production of a substantially pure calcium lactate which is separated, decomposed with the production of lactid and lactic acid anhydrid, and the latter substances converted into lactic acid, which is simultaneously separated.

The objects of my invention are to effect the preparation of lactic acid which will conform to the standards of the *United States Pharmacopœia* from the crude lactic acid solutions of commerce in an efficient manner, and this without the use of other than inexpensive and readily obtainable reagents, and by means of simple process steps which are readily adapted to practical use on a relatively large scale, and such other objects as will more fully hereinafter appear.

The crude lactic acid solutions of commerce contain approximately 50 per cent. of lactic acid together with a relatively large amount of impurities, the more important of which is butyric acid. There are also present some carbohydrate bodies, such as sugars, small amounts of glycerin, and numerous other organic bodies.

In carrying out the treatment of the crude lactic acid in accordance with my process, the solution of the acid is treated with sufficient pure slaked lime to render it neutral. The resulting reaction is exothermic, and sufficient heat is developed to cause the solution of the calcium salts of the lactic and other organic acids present, calcium lactate being readily soluble in an equal weight of hot water. It is, however, much less soluble in cold water than the salts of other organic acids present, for example, butyric acid, 1 gram of calcium lactate requiring 10 cc. of water at 15° C. to dissolve it, whereas the same amount of water at the same temperature will dissolve 35 gm. of calcium butyric.

If the solution, heated by the reaction between the acids present and the slaked lime, were now permitted to cool, the greater part of the calcium lactate present would crystallize out with the formation of a solid mass or cake containing a relatively high proportion of the butyrate and of other bodies, such as sugars, which would subsequently be difficult to remove. I have discovered that this condition may be prevented by a very simple procedure during the actual cooling of the contaminated solution of calcium lactate. Just as the crystallization of the calcium lactate takes place I add thereto an amount of distilled water equal in volume to the crude lactic acid originally treated, thereby effecting what can be considered as a washing out of the lactate during the very process of formation.

On cooling of the solution a quantity of the mother liquor equal to that added is removed, and an equal quantity of distilled water is then added. A quantity of the liquor equal to this last addition is again drawn off, leaving the calcium lactate in a state of relatively high purity together with substantially pure water. I next apply heat to the calcium lactate and water thereby causing the former to pass into solution, and permit the solution to cool. The calcium lactate is deposited in a solid mass of crystals, which I remove and press to expel the greater part of the water contained therein.

I now add to the mass of calcium lactate crystals an amount of water, preferably distilled, sufficient to dissolve the calcium lactate when hot, and apply heat until the lactate passes into solution. A quantity of 25 per cent. sulfuric acid calculated from the amount of calcium lactate to be sufficient to completely convert the lactate into lactic acid is then added, this resulting in a precipitation of relatively insoluble calcium sulfate and in the formation of free lactic acid. After adding the sulfuric acid I bring the entire mixture to the boiling point of water, at which temperature I maintain it until substantially all of the water has evaporated.

The product resulting at this point of my process contains not only calcium sulfate and lactic acid, but also some lactid and lactic acid anhydrid. In order to produce from this mixture a pure lactic acid, I have devised the following simple and expeditious method: I heat the mixture to a temperature of between 130° and 175° C. and maintain it at that temperature until the entire lactic acid content thereof is converted into the lactid and anhydrid. Dense white fumes are given off during this operation, and the resulting product is thick and syrupy and is insoluble in water. It is then washed with water to remove any soluble impurities, if necessary.

The product thus obtained is next subjected to distillation with superheated steam, the temperature of which is from 230° to 240° C. This distillation causes the hydrolysis of the lactid and anhydrid to lactic acid and the distillation of the latter leaving in the residue any impurities not already removed. This hydrolysis will be considerably accelerated, I have found, by the addition of a small amount of a suitable alkali, such as sodium hydroxid, to the mixture of lactid and anhydrid. The aqueous distillate obtained is now evaporated down until the acid content conforms to the pharmacopœial requirements, to which the product conforms in all other respects.

The quantity of each reagent used in the course of the process is determined by the amount of lactic acid or lactate contained in the original solution treated.

I claim:

1. In the process for the production of lactic acid, preparing calcium lactate, converting the calcium lactate into a mixture containing lactid and lactic acid anhydrid, hydrolyzing the lactid and anhydrid to lactic acid, and separating the lactic acid.

2. In the process for the production of lactic acid, preparing calcium lactate, converting the calcium lactate into a mixture containing lactid and lactic acid anhydrid, hydrolyzing the lactid and anhydrid to lactic acid, and simultaneously separating said lactic acid.

3. In the process for the production of lactic acid, preparing calcium lactate, converting the calcium lactate into a mixture containing lactid and lactic acid anhydrid, distilling said mixture with superheated steam, thereby hydrolyzing the lactid and anhydrid to lactic acid, and collecting the latter in the distillate.

4. In the process for the production of lactic acid, preparing calcium lactate, converting the calcium lactate into a mixture containing lactid and lactic acid anhydrid, distilling said mixture with superheated steam at 230° to 240° C., thereby hydrolyzing the lactid and anhydrid to lactic acid, and collecting the latter in the distillate.

5. In the process for the production of lactic acid, preparing calcium lactate, converting the calcium lactate into a mixture containing lactid and lactic acid anhydrid, distilling said mixture with superheated steam at 230° to 240° C., thereby hydrolyzing the lactid and anhydrid to lactic acid, collecting the latter in the distillate, and concentrating said distillate.

6. In the process for the production of lactic acid, preparing calcium lactate, treating the calcium lactate with sulfuric acid, thereby producing a mixture containing calcium sulfate and lactic acid, and converting the lactic acid into lactid and lactic acid anhydrid, hydrolyzing the lactid and anhydrid to lactic acid, and separating the latter.

7. In the process for the production of lactic acid, preparing calcium lactate, treating the calcium lactate with an aqueous solution of sulfuric acid, thereby producing a mixture containing calcium sulfate and lactic acid, drying said mixture, converting the lactic acid therein into lactid and anhydrid, purifying the resulting mixture, hydrolyzing the lactid and anhydrid to lactic acid, and separating the latter.

8. In the process for the production of lactic acid, preparing calcium lactate, treating the calcium lactate with an aqueous solution of sulfuric acid, thereby producing a mixture containing calcium sulfate and lactic acid, drying said mixture, heating the dried mixture to approximately 130° C., thereby coverting the lactic acid into lactid and anhydrid, removing soluble impurities from the resulting mixture, hydrolyzing the lactid and anhydrid to lactic acid, and separating the latter.

9. In the process for the production of lactic acid, treating crude lactic acid with an alkaline compound of calcium, thereby forming calcium lactate, purifying said calcium lactate during separation thereof from the solution, removing the calcium lactate, and preparing lactic acid therefrom.

10. In the process for the production of lactic acid, treating crude lactic acid with calcium hydroxid, adding water thereto during cooling at the moment of separation of the calcium lactate, further washing the calcium lactate, removing it from the solution, and preparing lactic acid therefrom.

11. In the process for the production of lactic acid, treating crude lactic acid with calcium hydroxid, adding water thereto during cooling at the moment of separation of the calcium lactate, further purifying and removing the calcium lactate, forming a solution thereof, treating said solution with sulfuric acid, and drying the resulting mixture of calcium sulfate and lactic acid, converting the lactic acid in said mixture into anhydrid and lactid, further purifying the resulting mixture, hydrolyzing the lactid and anhydrid to lactic acid, and separating the latter in finally purified state.

12. In the process for the production of lactic acid, converting crude lactic acid into calcium lactate, removing and purifying said calcium lactate, converting said calcium lactate into a mixture containing lactid and lactic acid anhydrid, hydrolyzing the lactid and anhydrid in said mixture to lactic acid, and separating the latter.

13. In the process for the production of lactic acid, preparing a partially purified calcium lactate, treating the calcium lactate with sulfuric acid, thereby producing a mixture containing calcium sulfuate and lactic acid, and converting the lactic acid into lactid and lactic acid anhydrid, further purifying the resulting mixture hydrolyzing the lactid and anhydrid to lactic acid and separating the latter in the pure state.

14. In the process for the production of lactic acid, preparing a partially purified calcium lactate, treating the calcium lactate with an aqueous solution of sulfuric acid, thereby producing a mixture containing calcium sulfate and lactic acid, drying said mixture, converting the lactic acid therein into lactid and anhydrid, further purifying the resulting mixture, hydrolyzing the lactid and anhydrid to lactic acid, and separating the latter in the pure state.

15. In the process for the production of lactic acid from crude materials, preparing a partially purified calcium lactate, treating the calcium lactate with an aqueous solution of sulfuric acid, thereby producing a mixture containing calcium sulfate and lactic acid, drying said mixture, heating the dried mixture to approximately 130° C., thereby converting the lactic acid into lactid and anhydrid, removing soluble impurities from the resulting mixture, and subjecting the purified mixture to the action of steam, thereby hydrolyzing the lactid and anhydrid to lactic acid and removing the latter in the pure state.

In testimony whereof, I affix my signature, in the presence of two witnesses.

EDGAR THEOPHILUS OLSON.

Witnesses:
GEO. B. DYGERT,
CARL DAINES.